United States Patent [19]

Avitan

[11] Patent Number: 5,267,116
[45] Date of Patent: Nov. 30, 1993

[54] ELECTRICAL SAFETY SOCKET

[75] Inventor: Shimon Avitan, Tzlafon, Israel

[73] Assignee: Aditan, Inc., Oyster Bay, N.Y.

[21] Appl. No.: 9,360

[22] Filed: Jan. 26, 1993

Related U.S. Application Data

[63] Continuation of Ser. No. 726,875, Jul. 8, 1991, which is a continuation of Ser. No. 573,717, Aug. 28, 1990, abandoned, which is a continuation of Ser. No. 302,285, Jan. 27, 1989, abandoned.

[30] Foreign Application Priority Data

Jan. 28, 1988 [IL]  Israel .......................................... 85233

[51] Int. Cl.⁵ .............................................. H02H 3/16
[52] U.S. Cl. ......................................... 361/45; 361/49; 307/326
[58] Field of Search ...................... 361/45, 49; 307/326

[56] References Cited

U.S. PATENT DOCUMENTS

| | | |
|---|---|---|
| 2,789,255 | 4/1957 | Mekler . |
| 2,985,800 | 5/1961 | Cook ................... 307/326 |
| 3,313,960 | 4/1967 | Borys .................... 361/77 |
| 3,895,195 | 7/1975 | Morrision et al. ............... 200/51.09 |
| 4,002,956 | 1/1977 | Muro et al. .................... 31/154 |
| 4,159,501 | 6/1979 | White .................... 361/47 |
| 4,871,924 | 10/1989 | Sellaki .................... 307/125 |
| 5,029,037 | 7/1991 | Bartelink .................... 361/49 |
| 5,069,632 | 12/1991 | Avitan . |

FOREIGN PATENT DOCUMENTS

| | | |
|---|---|---|
| 89101425 | 1/1989 | European Pat. Off. . |
| 2624316 | 12/1977 | Fed. Rep. of Germany . |
| 2643668 | 3/1978 | Fed. Rep. of Germany . |
| 3638737 | 7/1987 | Fed. Rep. of Germany . |
| 3707307 | 9/1988 | Fed. Rep. of Germany . |
| 2547464 | 12/1984 | France . |
| 81/01082 | 4/1981 | PCT Int'l Appl. . |
| 86/02500 | 4/1986 | PCT Int'l Appl. . |
| 609500 | 2/1979 | Switzerland . |

Primary Examiner—Todd E. DeBoer
Attorney, Agent, or Firm—Rosenman & Colin

[57] ABSTRACT

What is described is an electrical safety socket arrangement, comprising live and neutral socket inlets, switches connecting the live and neutral socket inlets to respective live and neutral socket outlets, and a circuit control which operates the switches when live and neutral supply feeders are connected to the socket inlets and a circuit is completed such that the circuit is completed by the connection of an appliance across the live and neutral socket outlets.

24 Claims, 2 Drawing Sheets

ELECTRICAL SAFETY SOCKET

This is a continuation of Ser. No. 07/726,875 filed Jul. 8, 1991 which is a continuation of application Ser. No. 07/573,717, filed Aug. 28, 1990 which is a continuation of application Ser. No. 07/302,285, filed Jan. 27, 1989 now abandoned.

BACKGROUND OF THE INVENTION

This invention relates generally to a mains supply safety socket and, in particular, to such a socket which is childproof. The general features of the invention are applicable to all mains supply sockets whether or not they are provided with a ground outlet. The term "socket" is taken to refer to any type of female connector for connecting a source of electric power to an appliance including, for example, wall and extension electricity supply sockets as well as electric light sockets.

It is known to provide mains supply safety sockets wherein the live and neutral outlets are covered with an insulating plate which is adapted to retract when the ground pin of a three pin plug is inserted into the ground outlet of the socket. It is generally arranged in such systems for the ground pin to be slightly longer than both the neutral and live pins in order to facilitate the operation of the safety mechanism.

One drawback with such a system is that the insulating plate is liable to jam. If it jams in the closed position the socket is unusable, and if it james in the open position the socket is usable but the safety device is inoperative. In either case, an electric cable connecting an appliance to the socket remains unprotected and there constantly exists across its live and neutral cores the full mains supply voltage, whether or not the appliance is switched on. Furthermore, such a system is not childproof in that it is readily appreciated that insertion of a ground pin, or any substitute therefor, will on its own retract the insulating plate, thereby overriding the safety mechanism. Indeed, this approach is sometimes adopted in order to connect the supply leads from an electrical appliance directly to the mains without first attaching a plug to the appliance, and is obviously highly unsatisfactory from a safety point of view.

SUMMARY OF THE INVENTION

It is an object of the invention to overcome or reduce at least some of the disadvantages associated with hitherto proposed systems. According to the invention there is provided an electrical safety socket, comprising:

live and neutral socket inlets, switching means for connecting said live and neutral socket inlets to respective live and neutral socket outlets, and circuit means including a first switching circuit connected between one of said socket inlets and a respective socket outlet, for operating said switching means when live and neutral suppply feeders are connected to respective said socket inlets and the circuit to said first switching circuit is completed;

the arrangement being such that an appliance connected across said live and neutral socket outlets completes the circuit to said first switching circuit.

Thus, in a socket according to the invention, the live and neutral feeders are connected to their respective socket outlets only when an electrical appliance is connected across the socket outlet, the electrical appliance effectively completing the circuit for the first switching circuit. Consequently, until an appliance is plugged in to the electrical socket, the electrical mains supply is disconnected from the socket outlets and the electrical socket is completely safe.

This will also apply if an appliance is plugged in to the socket outlets but is effectively disconnected therefrom by mans of a switch associated with the appliance. For as long as the appliance switch is open, the electrical socket according to the invention will remain de-energized, the mains supply voltage being prevented from appearing across the socket outlets. This represents a major advantage over hitherto proposed systems since, until the appliance is switched on, the cable connecting the appliance to the electrical socket is also completely isolated from the mains supply.

In a preferred embodiment, the first switching circuit is provided by means of a low voltage electromagnetic relay which is energized by means of a bridge rectifier connected across the a.c. live and neutral supply feeders when an appliance is connected across the respective socket outlet. The low voltage d.c. supply terminals are connected through the relay coil of the switching circuit via two normally closed switch contacts which are associated with the first switching circuit. Also associated with the first switching circuit are two normally open switch contacts which are adapted to connect, respectively, the live feeder to the live socket outlet and the neutral feeder to the neutral socket outlet, when the live and neutral feeders are connected to their corresponding inlets.

In such an arrangement, when an appliance plugged in to the socket outlet completes the low voltage d.c. circuit, the first switching circuit is energized, the two normally closed contacts open so as to interrupt the low voltage d.c. supply to the first switching circuit and the two normally open contacts close, thereby connecting the live and neutral feeders to their respective socket outlets. In order to maintain this connection, it is necessary that the first switching circuit should remain energized.

In a preferred embodiment, the relay is connected in series with the appliance across the mains supply voltage, such that the greater part of the mains supply voltage is dropped across the appliance, only a few volts being dropped across the low voltage relay. If required, a shut resistance may be connected across the relay coil in order to limit the current flowing through the relay coil.

In an alternative embodiment, the circuit means comprises a first switching circuit constituted, as above, by a low voltage electromagnetic relay, and a second switching circuit constituted by a mains voltage electromagnetic relay. The first switching circuit includes a normally open contact which is connected in series with the coil of the second switching circuit, such that when the first switching circuit is energized, the contact closes thereby completing the circuit to the second switching circuit.

The second switching circuit includes at least one normally closed contact in series with the relay coil of the first switching circuit, which thereby disconnects power to the first switching circuit when the second switching circuit is energized. In order to ensure that the second switching circuit remains energized, there is provided a latching circuit which may be constituted by a low voltage relay provided with a single normally open contact which is connected in parallel with the normally open contact of the first switching circuit. Thus, when the normally open contact of the first switching circuit closes, the latching circuit will also be energized and its normally open contact will close, thereby providing an alternative supply path for the second switching circuit even when the first switching circuit is disconnected.

In a third embodiment of the invention, the circuit means is again constituted by a single low voltage electromagnetic relay which is continuously energized only when an appliance is connected across the live and neutral socket outlets. However, in this embodiment, the connection of a first supply feeder to the first switching circuit is broken, the first switching circuit being connected to an additional socket outlet within a suitably adapted socket. The first supply feeder is fed to the appliance via an appliance plug in the normal manner, and is fed back to a corresponding additional pin within the appliance plug, and thence to the additional socket outlet. In this way, when the appliance is plugged in to the socket outlet and switched on, the first supply feeder is fed to the first switching circuit. This now becomes energized and connects the second supply feeder to the appliance which is thereby energized.

BRIEF DESCRIPTION OF THE DRAWINGS

The invention will now be described with regard to an electrical safety circuit for mounting inside an electrical socket and with reference to the accompanying drawings, in which:

FIG. 3 is a circuit diagram of a safety circuit in accordance with a third embodiment of the invention; and FIGS. 4a and 4b show a preferred arrangement for an additional socket outlet and corresponding plug pin for use with a third embodiment according to the invention.

DETAILED DESCRIPTION OF PREFERRED EMBODIMENTS

Figure 1:
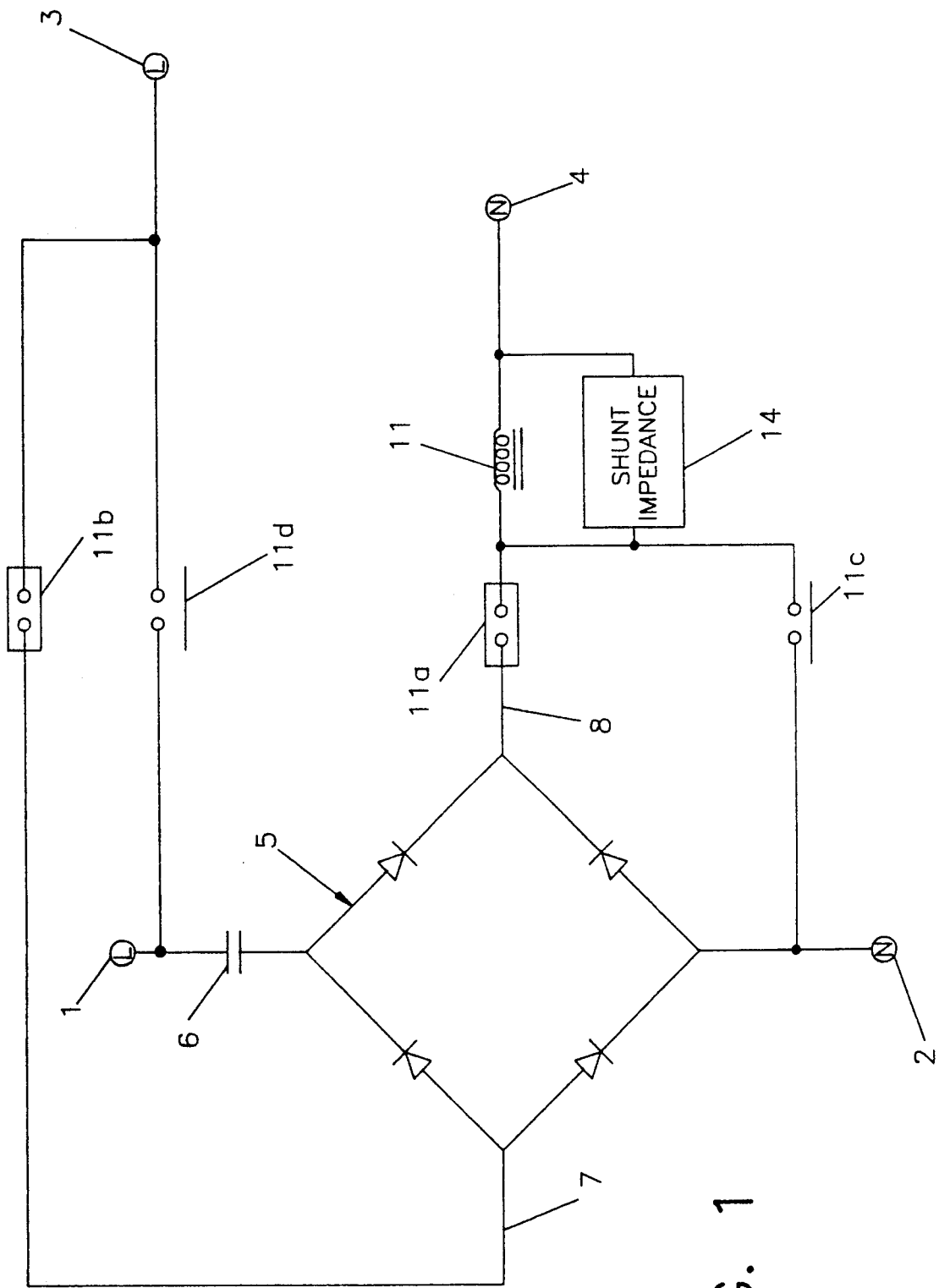
FIG. 1 is a circuit diagram of a safety circuit in accordance with a first embodiment of the invention.

Referring to FIG. 1, there is shown a circuit using electromagnetic relays for connecting live and neutral socket inlets 1 and 2 to respective socket outlets 3 and 4. Throughout the following description, it will be assumed that the live and neutral socket inlets 1 and 2 are connected to corresponding live and neutral feeders (not shown). A bridge rectifier 5 is connected in series with a capacitor 6 across the live and neutral socket inlets 1 and 2 so as to produce low voltage positive and negative supply rails 7 and 8, respectively. Connected in series between the low voltage supply rail 8 and the neutral socket outlet 4 is a relay coil 11 and a normally closed contact 11a. A second normally closed contact 11b is connected from the low voltage positive supply rail 7 to the live socket outlet 3. A first normally open contact 11a is connected between the unction of the relay coil 11 and the normally closed contact 11a, and the neutral socket inlet 2. A second normally open contact 11d is connected directly between the live socket inlet 1 and the live socket outlet 3. Also shown in the circuit is a shunt impedance 14 which is connected in parallel with the relay coil 11.

The operation of the circuit is as follows. The relay coil 11, the two normally closed contacts 11a and 11b, and the two normally open contacts 11c and 11d, constitute a first switching circuit. The capacitor 6 serves as a high impedance which limits the effective a.c. voltage across the low voltage bridge rectifier 5 which rectifies the resultant low a.c. voltage so as to produce the required low d.c. voltage across rails 7 and 8. Use of the capacitor 6 therefore obviates the need to use a transformer which is more commonly used in conjunction with a bridge rectifier, to produce low voltage d.c. from a relatively high a.c. voltage input. Such transformers are relatively bulky compared to the capacitor 6 and, if used, would prevent the circuit according to the invention from being implemented within a standard electrical socket.

When an electrical appliance (not shown) is plugged into the socket outlets 3 and 4, the electrical appliance completes the circuit through the normally closed contacts 11a and 11b, the rectifier 5 and the relay coil 11. The relay coil 11 is contained within a standard low voltage relay which thus becomes energized, thereby closing contacts 11a and 11d, whilst opening the normally closed contacts 11a and 11b.

When the normally open contact 11c closes, the neutral socket inlet 2 is connected to the neutral socket outlet 4 via the parallel combination of the relay coil 11 and the shunt impedance 14. Similarly, when the normally open contact 11d closes, the live socket inlet 1 is connected directly to the live socket outlet 3. Thus, the relay coil 11 continues to be energized by the live and neutral feeders, respectively, through the now closed contacts 11c and 11d, the circuit being completed by the appliance connected to the live and neutral socket outlets 3 and 4, respectively. At the same time, the low voltage d.c. supply appearing across the low voltage positive and negative supply rails 7 and 8, is disconnected from the relay coil 11, as a result of the normally closed contacts 11a and 11b now being open.

It will be understood that in this embodiment the parallel combination of the relay coil 11 and the shunt impedance 14, together with the appliance itself connected across the live and neutral socket outlets 3 and 4, constitute a potential divider, in which the proportion of the total mains supply voltage appearing across the relay coil 11 is a function of the impedance of the appliance compared with that of the parallel combination of the relay coil 11 and the shunt impedance 14. Thus, the value of the shunt impedance 14 is selected in order to ensure that the majority of the mains supply voltage appears across the appliance, only a small and safe residue remaining across the relay coil 11. In this embodiment, only a small d.c. voltage appears across the live and neutral socket outlets 3 and 4, until an appliance is both plugged into the socket outlets and switched on.

Thus, until the appliance is switched on only a small d.c. voltage appears across the live and neutral socket outlets 3 and 4, this same small d.c. voltage also appearing across the corresponding live and neutral cores within a cable connecting the appliance to the electrical safety socket. Under these circumstances, both the socket and the appliance cable are electrically safe until the appliance is switched on, when nearly the full mains supply voltage will appear across the live and neutral socket outlets 3 and 4, as explained above.

Figure 2:
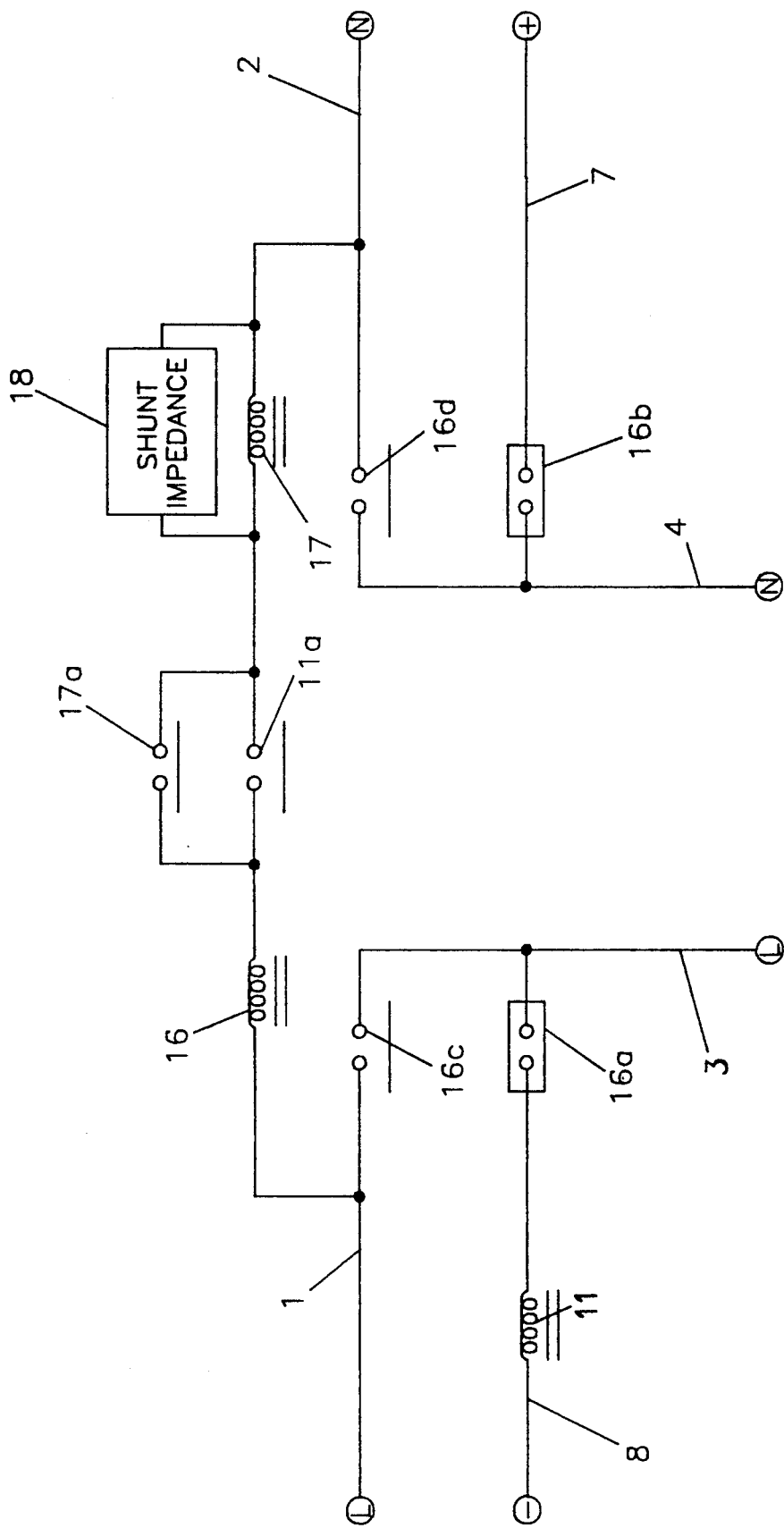
FIG. 2 is a circuit diagram of a safety circuit in accordance with a second embodiment of the invention.

Referring to FIG. 2, there is shown a second embodiment wherein live and neutral socket inlets 1 and 2 are adapted to be connected to respective socket outlets 3 and 4. A combination of a bridge rectifier and capacitor (not shown) connected across the live and neutral socket inlets 1 and 2 produce low voltage positive and negative supply rails 7 and 8, respectively, in an identical manner to that described with reference to FIG. 1 above.

Connected to the low voltage negative supply rail 8 is one end of a relay coil 11 whose other end is connected to one terminal of a normally closed contact 16a whose other end is connected to the live socket outlet 3. Connected to the low voltage positive supply rail 7 is a second normally closed contact 16b whose other end is connected directly to the neutral socket outlet 4. Additionally, the live socket inlet 1 is connected directly to the live socket outlet 3 by means of a normally open contact 16c and, similarly, the neutral socket inlet 2 is connected directly to the neutral socket outlet 4 by means of a normally open contact 16d.

Also connected across the live and neutral socket inlets 1 and 2 is a second relay coil 16 in series with a normally open contact 11a and a third relay coil 17 across which is connected a shunt impedance 18. A normally open contact 17a is connected in parallel with the normally open contact 11a.

The operation of the circuit is as follows. The relay coil 11 and the normally open contact 11a constitute a first switching circuit wherein the contact 11a closes when the relay coil 11 is energized. Similarly, the relay coil 16 together with the contacts 16a, 16b, 16c and 16d, constitute a second switching circuit wherein when the relay coil 16 becomes energized, contacts 16a and 16b open and contacts 16c and 16d close. The relay coil 17 together with the normally open contact 17a constitute a latching circuit wherein the contact 17a closes when the relay coil 17 becomes energized.

When an electrical appliance (not shown) is plugged in to the socket outlets 3 and 4, the electrical appliance completes the circuit through the normally closed contacts 16a and 16b, the rectifier 5 and the relay coil 11. The relay coil 11 is contained within a standard low voltage relay which thus becomes energized thereby closing contact 11a.

When contact 11a closes, the circuit from the live feeder through the relay coil 16, contact 11a and back to the neutral feeder becomes completed and, therefore, the relay 16 becomes energized. The relay 16 is any suitable relay which operates from an a.c. mains voltage, and its normally open contacts 16c and 16d must be suitable for operation at electrical mains voltages and must also have a current rating commensurate with the current rating of the socket. Upon coil 16 becoming energized, the normally closed contacts 16a and 16b open, thereby interrupting the d.c. voltage supply to the coil 11. At the same time, the normally open contacts 16c and 16d close and, in so doing, switch the live feeder to the live outlet 3 and the neutral feeder to the neutral outlet 4.

As soon as the low voltage d.c. supply is interrupted to the relay coil 11, the contact 11a opens and would, therefore, tend to interrupt the mains supply voltage to the coil 16. The relay 17 prevents this from happening since, being connected in series with the relay coil 16, it also becomes energized when the contact 11a closes. When the relay coil 17 becomes energized, the normally open contact 17a closes in parallel with the contact 11a, so that when contacts 16a and 16b open, interrupting power to the relay coil 11 and opening the contact 11a, the relay coils 16 and 17 are provided with an alternative current path through contact 17a. The relay coil 17 together with the normally open contact 17a thereby function as a latching circuit which ensures that the power supply to the relay coil 16 is maintained even when the relay coil 11 is switched out of circuit.

The relay coil 17 is preferably constituted by a low voltage miniature relay whose contact 17a is rated for operation at mains supply voltages and currents. The shunt impedance 18 may be constituted by a resistance or an inductance and its value is chosen compared with the impedance of the relay coil 17 so that most of the a.c. mains voltage is dropped across the relay coil 16, only a small fraction being applied across the relay coil 17. This arrangement works satisfactorily when the relay coil 17 is designed to operate from a low a.c. voltage. However, in an alternative embodiment the relay coil 17 may be adapted to operate from a low d.c. voltage, in which case a suitable rectifier (such as is constituted by the bridge rectifier 5) may be used in order to convert the low a.c. voltage across the coil 17 to a corresponding d.c. voltage.

In an alternative arrangement of this embodiment, the relay coils 16 and 17 may be connected in parallel, both in series with the parallel combination of contacts 11a and 17a. In this case, there must be connected in series with the relay coil 17, an impedance whose value is chosen so that substantially all the mains voltage is dropped across the impedance, with only a safe residue dropped across the relay coil 17.

The relay coil 11 is selected to operate from a low d.c. voltage, in order that the voltage initially appearing across the socket outlets 3 and 4 be insufficiently large to cause harm to a person making simultaneous contact with the two socket outlets. It will be understood that the resistance of the human body is too high to permit a sufficiently large current to flow through the human body in order to energize the relay coil 11. Under these circumstances, the circuit as described provides a simple, miniature and relatively cheap method of preventing the live and neutral feeders from being connected to their respective socket outlets until an appliance is plugged in to the outlets.

FIG. 3 shoes a third embodiment of the invention comprising live and neutral socket inlets 1 and 2 which are adapted to be connected to live and neutral socket outlets 3 and 4, as above. Also as above, one input terminal of a bridge rectifier 5 is connected in series with a capacitor 6 to the live socket inlet 1, the function of the capacitor 6 being identical to that of the first two embodiments described with reference to FIGS. 1 and 2 above. The other input terminal of the bridge rectifier 5 is connected to an additional socket outlet 20, which would constitute a fourth socket outlet in a standard socket containing live, neutral and ground outlets. Connected directly across the output terminals of the bridge rectifier 5 is a low voltage d.c. electromagnetic relay coil 11 provided with a single normally open contact 11a which is connected between the live socket inlet 1 and the live socket outlet 3. Similarly, the neutral socket inlet 2 is connected to the neutral socket outlet 4 via a normally open contact 21, which is adapted to close when a plug (not shown) connected to an electrical appliance 22 is inserted into the socket.

The appliance 22 is preferably fitted with a double pole switching including live and neutral contacts 23 and 24, respectively, which provide separate isolation of the live and neutral connections to the appliance 22. The supply end of the live contact 23 is connected via one core 26 of the appliance cable to the live pin of the appliance plug. Similarly, the supply end of the neutral switch 24 is connected via a second core 27 of the appliance cable to the neutral pin of the appliance plug. The other end of the neutral switch 24, as well as being connected in the normal manner to the appliance, is also connected via a third core 28 of the appliance cable to an additional pin in the appliance plug, which must therefore be specially adapted for the purpose. Thus, in the event that the appliance also requires a ground connection (not shown), the socket must be provided with four outlets, the appliance plug with four pins and the appliance cable with four cores.

The operation of the circuit is as follows. When the appliance plug is inserted into the socket, the normally open contact 21 closes, thereby connecting the neutral feeder to the neutral socket outlet 4. When the appliance 22 is switched on, the neutral switch 24 closes, thereby connecting the neutral feeder via the neutral socket outlet 4 and the neutral core 27 within the appliance cable to the additional core 28 of the appliance cable, and via the additional socket connection 20 to the neutral input connection of the bridge rectifier 5. Since the live feeder is permanently connected to the bridge rectifier 5 by the capacitor 6, the bridge rectifier 5 will start to conduct current as soon as the neutral connection to the bridge rectifier 5 is completed via the additional connection 20. Thus, under these conditions, the relay coil 11 is energized and the normally open contact 11a closes. This permits the live feeder to be connected to the live socket outlet 3, thereby completing the connection of the live and neutral feeders to their respective socket outlets 3 and 4.

In the above embodiment, even through the neutral feeder is connected to the neutral socket outlet 4 immediately on insertion of the appliance plug into the socket, the live feeder is not connected to the live socket outlet 3 until the appliance 22 is switched on, thereby closing the live and neutral switches 23 and 24.

FIGS. 4a and 4b show, respectively, an additional socket outlet 30 and a corresponding plug pin 31 which may be used in the third embodiment in order to connect the neutral wire 28 within the appliance 22 to the neutral wire 20 connected to the bridge rectifier 5, at the same time closing the normally open contact 21.

The plug pin 31 shown in FIG. 4b may be constituted by a simple brass prong in the middle of which are provided two recesses 33 and 34. The socket outlet 30 may be constituted by a corresponding brass tube of sufficient diameter to accommodate the plug pin 31. Provided along a longitudinal axis of the socket outlet 30 are four apertures which accommodate corresponding peripheral insulating prongs 35a and 35b and corresponding central insulating prongs 36a and 36b. The peripheral prongs 35a and 35b are connected by respective U-shaped members 39a and 39b to electrical contacts 41a and 41b. Similarly, the central prongs 36a and 36b are connected by U-shaped member 40a and 40b to contacts 42a and 42b.

Contacts 41a and 41b constitute first contacts of two normally open switches whose second contacts are 43a and 43b, respectively. Similarly, contacts 42a and 42b constitute first contacts of two normally closed switches whose second contacts are 44a and 44b, respectively. Contact 43s is connected directly to the conductive tube of the socket outlet 30. Contact 41a is connected directly to contact 42a, contact 44a is connected to contact 44b, and contact 42b is connected via an electrical wire 47 to the neutral supply connection of the bridge rectifier 5 shown in FIG. 3. Contact 43b is connected directly to the neutral supply feeder whilst contact 41b is connected directly via a conducting wire 48 to the neutral socket outlet. Thus, the normally open switch constituted by contacts 41b and 43b is equivalent to the normally open contact 21 shown in FIG. 3.

The prongs 35a, 35b, 36a and 36b are biased via springs 49a, 49b, 50a and 50b such that the two normally open pairs of switch contacts remain open and the two normally closed pairs of switch contacts remain closed.

The additional socket outlet functions as follows. As soon as the plug pin 31 is inserted into the socket outlet 30, the prong 35b is pushed up against the biasing spring 49b, causing the normally open contacts 41b and 43b to close. As soon as this occurs, the neutral supply feeder connected to the contact 43b is connected via contact 41b and wire 48 to the neutral socket outlet. Although this provides the neutral connection to the electrical appliance, it will be understood from the description above with reference to FIG. 3, that the live supply to the appliance is not completed until the neutral supply is returned from the appliance to the neutral supply connection of the bridge rectifier 5 shown in FIG. 3. For as long as any of the switches constituted by contacts 41a and 43a, 42a and 44a or 42b and 44b remain open, the neutral connection from the socket outlet 30 to the conducting wire 47 remains broken, and consequently the relay 11 shown in FIG. 3 remains de-energized. As the plug pin 31 is inserted further into the socket 30, the prong 36b is pushed upwards against its biasing spring 50b, thereby opening the normally closed switch constituted by contacts 42b and 44b. As the plug pin 31 is pushed further into the socket outlet 30, the prong 36a is likewise pushed upwards against its biasing spring 50a, thereby opening the normally closed switch constituted by contacts 42a and 44a.

When the plug pin 31 is fully inserted into the socket outlet 30, the prong 35a is pushed upwards against its biasing spring 49a, closing the normally open switch constituted by contacts 41a and 43a. At the same time, the prongs 36a and 36b fall under the influence of their corresponding biasing springs 50a and 50b into the recesses 33 and 34 of the plug pin 31. When this happens, the three switches constituted by contacts 41a and 43a, 42a and 44a, and 42b and 44b, all close, thereby completing the neutral supply from the socket outlet 30 to the conducting wire 47. This, in turn, completes the neutral supply to the bridge rectifier 5 shown in FIG. 3, thereby energizing the relay coil 11 which now functions as described above with reference to FIG. 3.

It will be understood from the foregoing description that, since the appliance itself completes the circuit to the relay coil 11 in all three embodiments, the electrical appliance must be switched on in order for the circuit to operate. Thus, a cable connecting an electrical appliance to a socket protected by any of the circuits as described, will be completely isolated form the live feeder whilst the appliance is switched off. No harm can possibly befall a person who inadvertently trips over the cable, or even to someone who wilfully cuts the cable providing that, in so doing, no electrical connection is effected between the live and neutral cores of the first two embodiments, or the two neutral cores of the third embodiment.

The relay sin each of the three embodiments of the invention are constituted by miniature components which may fit easily into the empty space behind a standard electrical socket. The bridge rectifier 5 and the capacitor 6 may most conveniently be soldered directly to the corresponding relay terminals (without employing a circuit board) in order to reduce to a minimum the volume occupied by the safety circuit.

Although the preferred embodiments have been described with reference to circuits utilising electro-magnetic relays, it will be understood that the same principles may be applied in order to construct similar circuits utilizing solid-state circuit elements.

I claim:

1. An electrical safety socket comprising:
   live and neutral socket inlets,
   live and neutral socket outlets,
   switching means for connecting said live and neutral socket inlets to respective live and neutral socket outlets, and
   circuit means including a first switching circuit connected between one of said socket inlets and a respective socket outlet, for operating said switching means when live and neutral supply feeders are connected to respective said socket inlets and a circuit to said first switching circuit is completed;
   the arrangement being such that an appliance connected across said live and neutral socket outlets completes the circuit to said first switching circuit.

2. A socket according to claim 1 wherein said switching means are constituted by normally open switches.

3. A socket according to claim 1 wherein said first switching circuit includes a first electro-magnetic relay.

4. A socket according to claim 3 wherein said first electromagnetic relay is adapted to operate from a low voltage.

5. A system according to claim 4, wherein said relay is adapted to operate from a d.c. voltage source.

6. A system according to claim 5, wherein said d.c. voltage source is derived from the voltage across said live and neutral supply feeders by means of a rectifier circuit connected in series with a high impedance element.

7. A system according to claim 6, wherein said high impedance element is constituted by a capacitor.

8. A socket according to claim 5 wherein said switching means further includes at least one normally closed contact in series with said relay coil and said d.c. voltage source.

9. A socket according to claim 8 wherein a shunt impedance is connected across said relay coil in order to limit the current flow through said relay coil.

10. A socket according to claim 9 wherein said shunt impedance is constituted by an inductive element.

11. A socket according to claim 10 wherein said relay is connected in series with one of said normally open contacts and a corresponding socket inlet.

12. A socket according to claim 11 wherein the operation of said relay is adapted to open said at least one normally closed contact and to close said normally open contacts.

13. A socket according to claim 3 wherein said circuit means further includes:
   a second switching circuit responsive to said first switching circuit for connecting said live and neutral socket inlets to said respective live and neutral outlets and disconnecting said first switching circuit, and
   a latching circuit coupled to said live and neutral socket inlets and responsive to said first switching circuit for maintaining the supply to said second switching circuit when said first switching circuit is disconnected.

14. A socket according to claim 13 wherein said second switching circuit is constituted by an electro-magnetic relay.

15. A socket according to claim 13 wherein said latching circuit is constituted by a low voltage electromagnetic relay.

16. A system according to claim 15 wherein the relay coil of said latching circuit is connected in series with the relay coil of said second switching circuit, so as to form a voltage divider across said live and neutral socket inlets, the correct relationship between the impedances of said relay coils being maintained by means of a shunt impedance connected across the relay coil of said latching circuit.

17. A system according to claim 13 wherein the relay coil of said latching circuit is adapted to operate from a d.c. voltage.

18. A system according to claim 17 wherein said d.c. voltage is derived by means of a rectifier connected in series with an impedance across said live and neutral socket inlets.

19. A system according to claim 18 wherein said impedance is constituted by a capacitor.

20. A socket according to claim 3 further including an additional socket outlet adapted to connect a first of said supply feeders to said first switching circuit, when an electrical appliance is plugged into said socket and said first supply feeder is connected to a respective said socket inlet.

21. A socket according to claim 20 wherein a first of said normally open switches is adapted to close when a corresponding additional plug is partially inserted into said additional socket outlet, thereby connecting said first supply feeder to said appliance.

22. A socket according to claim 21 further including at least one additional normally open switch which is adapted to close when said additional plug pin is fully inserted into said additional socket outlet, thereby connecting said first supply feeder from said first socket outlet back to said first switching circuit through said appliance.

23. A socket according to claim 22 wherein there is further provided in series with said additional normally open switch at least one normally closed switch which is adapted to open when said additional plug pin is partially inserted into said additional socket outlet.

24. An electrical connector for providing the additional socket outlet and plug pin in claim 20, comprising:
   a conducting tube provided with first and second peripheral apertures and at least one central aperture for accommodating respective insulating prongs,
   first switch contacts rigidly attached to said insulating prongs,
   second switch contacts associated with said first switch contacts,
   biasing means for biasing said peripheral first and second switch contacts open and said central first and second switch contacts closed, and
   said plug pin being provided with at least one recess for accommodating each of said central prongs when said plug pin is fully inserted into said conducting tube;
   the arrangement being such that a supply feeder is connected to said first peripheral first switch contact, said first peripheral second switch contact is connected to a first contact of an appliance switch,
a second contact of said appliance switch is connected to a first central first switch contact,
said second peripheral second switch contact is connected to said conducting tube, and
said second peripheral switch and each said central switch are connected in series.

* * * * *